(12) United States Patent
Balasubramanian

(10) Patent No.: US 6,335,800 B1
(45) Date of Patent: Jan. 1, 2002

(54) METHOD OF MULTIDIMENSIONAL INTERPOLATION FOR COLOR TRANSFORMATIONS

(75) Inventor: Thyagarajan Balasubramanian, Webster, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/210,194

(22) Filed: Dec. 11, 1998

(51) Int. Cl.[7] .............................. G06F 15/00; H04N 1/46; G06K 9/00
(52) U.S. Cl. ............................ 358/1.9; 358/525; 382/167
(58) Field of Search ........................ 358/1.9, 1.13, 358/1.12, 1.5, 1.18, 518, 520, 523, 525, 428; 382/162, 165, 167

(56) References Cited

U.S. PATENT DOCUMENTS

| | | | |
|---|---|---|---|
| 4,275,413 A | | 6/1981 | Sakamato et al. ............ 358/80 |
| 4,941,039 A | * | 7/1990 | E'Errico ........................ 358/80 |
| 4,992,861 A | * | 2/1991 | D'Errico ....................... 358/75 |
| 5,208,911 A | * | 5/1993 | Newman et al. ............. 395/162 |
| 5,420,979 A | * | 5/1995 | Madden et al. .............. 395/162 |
| 5,428,465 A | | 6/1995 | Kanamori et al. ........... 358/518 |
| 5,649,072 A | * | 7/1997 | Balasubramanian et al. ..... 395/109 |
| 5,719,956 A | * | 2/1998 | Ogatsu et al. ................ 382/167 |
| 5,739,927 A | * | 4/1998 | Balasubramanian et al. ..... 358/518 |
| 5,991,511 A | * | 11/1999 | Branger ....................... 395/109 |

OTHER PUBLICATIONS

Allebach, J.P., Chang, J. Z., Bouman, C. A., "Efficient Implementation of Nonlinear Color Transformations", IS&T and SID's Color Imaging Conference: Transforms & Transportability of Color (1993), pp. 143–148.

* cited by examiner

Primary Examiner—Madeleine Nguyen
(74) Attorney, Agent, or Firm—Fay, Sharpe, Fagan, Minnich & McKee, LLP

(57) ABSTRACT

An electronic imaging system includes a receiver for receiving a digital representation of an input image, and a conversion processor for converting the input image to an output image, typically defined by distinct color spaces. The conversion processor is configured as a multidimensional look up table containing nodes at each of series of predefined input addresses. Each node is preloaded with an output color value corresponding to the input addresses. The look up table can accommodate a more efficient placement of nodes within N-dimensional space by a particular method of multidimensional interpolation. The method includes applying an interpolation algorithm in N–1-dimensional space, and then performing a 1-dimensional linear interpolation in the remaining dimension between the resulting values. Such a method allows for nodes to be allocated to rapidly changing areas within the color space represented by the LUT, while less dynamic areas can be suitably served by fewer nodes.

16 Claims, 6 Drawing Sheets

METHOD OF MULTIDIMENSIONAL INTERPOLATION FOR COLOR TRANSFORMATIONS

BACKGROUND OF THE INVENTION

The present invention is directed to the digital imaging arts. It finds particular application to multidimensional interpolations for color transformations to enable more efficient placement of nodes in a look up table and will be described with particular reference thereto. It is to be appreciated however, that the proposed invention may also be applied to any type of look up table or conversion means processing a complex function.

Computers and other electronic equipment typically depict color in 3-D coordinates such as RGB. Many printers, on the other hand, print in either three-dimensional colorant space, cyan, magenta, yellow (CMY) or four-dimensional colorant space, cyan, magenta, yellow, and black (CMYK) which correspond to the input values, e.g. RGB. Frequently, a device independent color space is used as an intermediate representation of the image. A common choice for such a device independent space is a luminance-chrominance space, denoted generically as $LC_1C_2$. In use, translations are then needed from input RGB to $LC_1C_2$, and from $LC_1C_2$ to printer colorant space. A common example of a luminance-chrominance space is CIE L*a*b*.

Unfortunately the translation between these, and other, standards is not linear. Indeed, because the characterization and correction between input and output color spaces is complex, often transformations are implemented with a multidimensional lookup table (LUT). Consider, as an example, a transformation T from a 3 dimensional input space, e.g. scanner RGB, to a 3 dimensional output space e.g. CIE L*a*b*. The LUT then consists of a 3 dimensional rectangular grid of $N_R \times N_G \times N_B$ nodes, where $N_I$ is the number of grid locations along the I-th axis, I=R,G,B. At each node location, an L*a*b* value is stored. The transformation T is then approximated by locating for a given input RGB, the enclosing rectangular cell, and then performing 3-D interpolation among the L*a*b* values stored at the cell vertices or nodes.

A problem with multidimensional grids that are based on the typical rectangular structure described above is that as the input dimensionality increases, the size of the LUT increases exponentially. To give an idea, if $N_j=16$ (this is a common choice for 3-D grids), then for 3-D input, we have 4K nodes in the LUT; for 4-D input there are 64K nodes; and 5 input signals result in 1M nodes. In many applications, color transformation LUTs are 3-dimensional, and hence storage and memory requirements are not very significant issues. However, a common example where the input dimensionality is greater than 3, would be the characterization function for a printer employing 4 or more inks. This requires a transformation from N-dimensional colorant space (N>3) to some 3-D calorimetric space. In such situations, the size of the LUT does become a considerable problem. The only way to keep the LUT to an acceptable size is by limiting the number of nodes along each input dimension; thus potentially sacrificing accuracy.

An additional difficulty with multidimensional rectangular grids is that the 4K nodes, for example, are dispersed evenly throughout the color space represented by the rectangular grid. This uniform dispersal causes some of the output data stored in the grid nodes to correspond to insignificant or imperceptible changes in output tone or color vis-a-vis neighboring nodes. In other words, several distinct input addresses produce essentially the same output, effectively wasting some of the storage potential of the LUT.

Consider a 3-D example of a LUT that transforms RGB to L*a*b* using a conventional LUT structure. Referring to FIG. 1, the 3-dimensional LUT can be envisioned as a cube 10 containing nodes at preselected addresses along axes R, G, and B. An input color 12 defined by input color address components $R_{in}$, $G_{in}$, $B_{in}$, typically will not coincide with the preselected addresses. Thus, the input color address components $R_{in}$, $G_{in}$, $B_{in}$, are used to determine the 8 vertices $V_1$, ..., $V_8$ most closely adjacent to the input color 12. The output L*a*b* value that corresponds to the input color 12 is approximated by some form of 3-D interpolation from output color values stored within the 8 vertices $V_1, \ldots, V_8$. Common forms of 3-D interpolation are trilinear, tetrahedral, and prism interpolation. Note should be taken that typical interpolation algorithms depend on a rectangular grid or node structure (i.e. the grid is a 3-D 5×5×5 lattice of nodes).

The present invention provides an alternate structure for the multidimensional LUT, that provides greater flexibility in placing the nodes, than is allowed by the conventional grid. This allows a more efficient scheme for positioning the nodes where needed, and thus promises a reduction in LUT size in addition to overcoming other problems.

BRIEF SUMMARY OF THE INVENTION

In accordance with the present invention, a method of transforming an input color to an output color using a multidimensional color transformation table is provided. The table includes a plurality of nodes each containing an output color value. The method comprises a specific type of non-rectangular spacing of the plurality of nodes within a color space defined by the transformation table. An input color is received adjacent to which a first set of nodes and a second set of nodes are selected. Output color values from the first and second set of nodes are interpolated producing a first and second output color boundary. A one dimensional interpolation is then performed on the first and second boundaries producing the output color.

In accordance with another aspect of the present invention, the transformation table defines N input dimensions, where N is an integer greater than 1. The table is configured as a plurality of N−1 dimensional arrays or tables disposed along a remaining input dimension. The method includes noting in the input color a first component associated with the N−1 dimensional tables, and a second component associated with the remaining input dimension.

In accordance with another aspect of the present invention, the selecting step includes selecting from the plurality of N−1 dimensional tables both (1) a first table being one of the N−1 dimensional tables adjacent to the second component; and (2) a second table being one of the N−1 dimensional tables oppositely adjacent to the second component. In each of the selected tables, a plurality of nodes surrounding the first component is then identified.

In accordance with another aspect of the present invention, the nonrectangularly spacing step includes loading a plurality of nodes surrounding the first component is then identified.

In accordance with another aspect of the present invention, the nonrectangularly spacing step includes loading a plurality of nodes throughout the color space represented by the table such that the output color value of selected ones of the nodes are significantly distinct from output image values of other nodes.

In accordance with another embodiment of the present invention, an electronic imaging system includes a receiver for receiving an input image defined by N dimensional color space, where N is an integer greater than 1. A conversion processor is also included to convert the input image to an output image. The conversion processor includes an N dimensional lookup table defining a plurality of nodes each loaded with an output image value. An N–1 dimensional interpolator produces a first and second output image boundary value associated with N–1 dimensions of the input image. A one dimensional interpolator, interpolates between the first and second output image boundary values to provided the output image.

In accordance with another aspect of the present invention, the lookup table comprises a plurality of N–1 dimensional tables spaced along a remaining input dimension. Selected tables contain arrangements of nodes different than selected others of the tables.

One advantage of the present invention resides in the more efficient placement of nodes in the look up table.

Another advantage of the present invention resides in the optimizing of look up table node placement with respect to the distinctiveness of the output corresponding to each node.

Another advantage of the present invention resides in even greater efficiency as the number of input elements increases.

Other advantages and benefits of the present invention will become apparent to those of ordinary skill in the art upon reading and understanding of the preferred embodiments.

BRIEF DESCRIPTION OF THE DRAWINGS

The invention may take physical form in certain parts and arrangements of parts and I various steps and arrangements of steps. The drawings are only for purposes of illustrating the preferred embodiments and are not to be construed as limiting the invention.

DETAILED DESCRIPTION OF THE PREFERRED EMBODIMENTS

Figure 1:
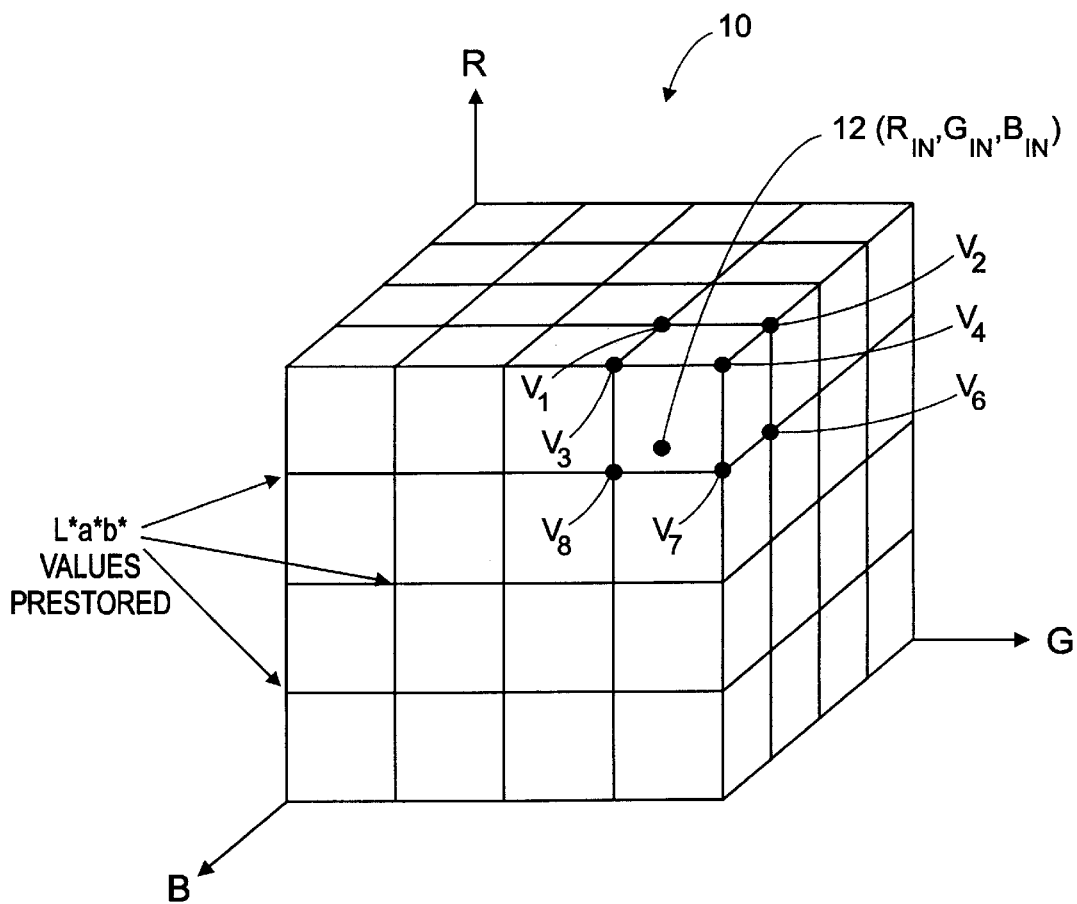
FIG. 1 is a graphical depiction of a prior art look up table.
Figure 2:
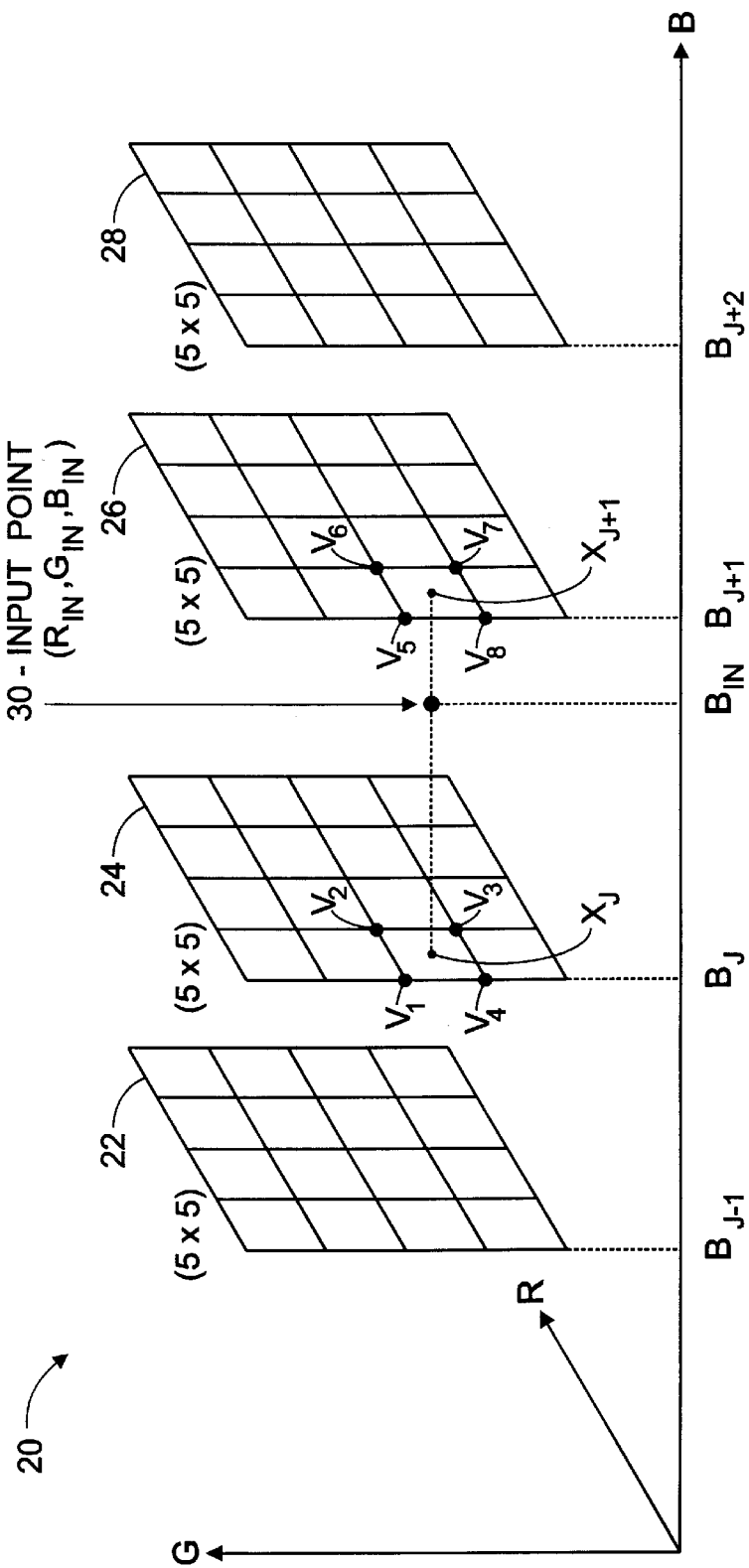
FIG. 2 is a graphical depiction of a rectangularly arranged look up table suitable to practice both prior art and the present invention.

With reference to FIG. 2, solving the previous example of a 3-to-3 transformation from RGB to L*a*b*, a look up table 20 can be envisioned as a set of R-G grids 22, 24, 26, 28 each at a fixed value of B. An input color 30 defining address components $R_{in}$, $G_{in}$, $B_{in}$ is received by an electronic imaging system (not shown). Address component $B_{in}$ is used to select from all the nodes in the LUT 20 the nodes corresponding to the R-G planes on either side of the input color 30 along the B axis. In other words, address component $B_{in}$ selects from the total number of 2-dimensional tables or R-G grids 22, 24, 26, 28 a lower table 24 and an upper table 26. Within the lower table 24, a set of nodes or vertices $V_1$, $V_2$, $V_3$, $V_4$ are identified surrounding the input addresses $R_{in}$, $G_{in}$ for a fixed or predetermined $B=B_j$ corresponding to table 24. Similarly, within the upper table 26 a set of nodes or vertices $V_5$, $V_6$, $V_7$, $V_8$ are identified surrounding the input addresses $R_{in}$, $G_{in}$ for a predetermined $B=B_{j+1}$ corresponding to table 26.

A 2-dimensional interpolation (e.g. using a bilinear or triangular method) around the input address $R_{in}$, $G_{in}$ is performed on color values stored in the lower set of nodes $V_1$, $V_2$, $V_3$, $V_4$ to determine a lower output color boundary $X_j$ (i.e. an L*a*b* value), corresponding to $R_{in}$, $G_{in}$, $B_j$. Likewise, color values stored in the upper set of nodes $V_5$, $V_6$, $V_7$, $V_8$ is interpolated to determine an upper output color boundary $X_{j+1}$, corresponding to $R_{in}$, $G_{in}$, $B_{j+1}$. To complete the transformation, a 1-dimensional interpolation is performed on the lower output color boundary $X_j$ and the upper output color boundary $X_{j+1}$, around the remaining input color address $B_{in}$ to produce the output color X such that:

$$x = X_j + \left(\frac{B_{in} - B_1}{B_2 - B_1}\right)(X_{j+1} - X_j) \qquad \text{EQ. 1}$$

It is significant that by breaking down the 3-D interpolation problem into 2-D interpolation followed by 1-D interpolation, a major constraint on the conventional rectangular grid structure has been removed: namely the 2-dimensional R-G grids or tables corresponding to the different $B_j$ no longer have to be coincident in the R-G plane.

Figure 3:
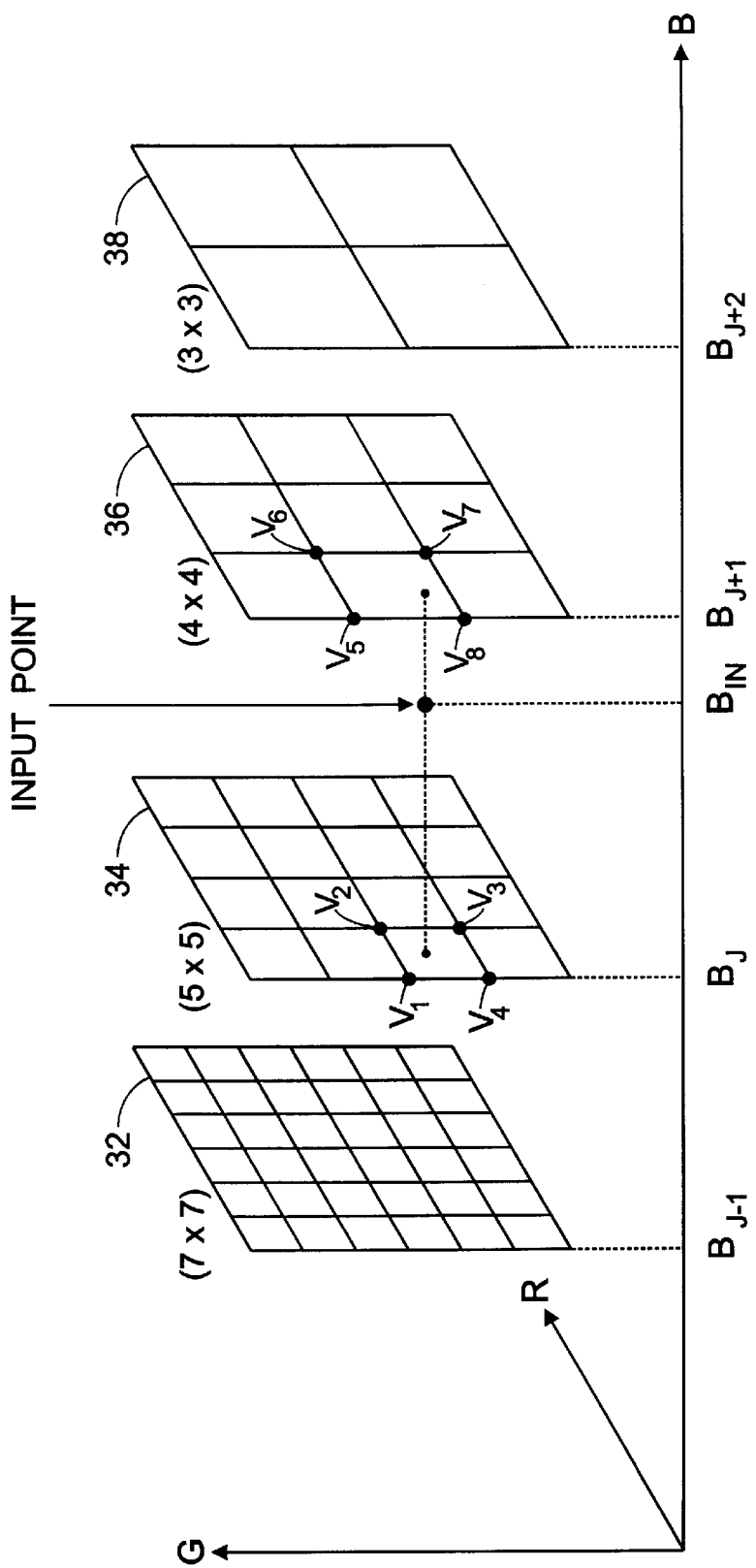
FIG. 3 is a graphical depiction of a non-rectangularly arranged multi-dimensional lookup table suitable to practice the present invention.

This embodiment is illustrated in FIG. 3, where each R-G plane 32, 34, 36, 38 has a different 2-D grid structure. That is, table 32 is configured as a 5×5 grid, table 34 is configured as a 4×4 grid and so on. This added flexibility, caused by the fact that not all the 3 dimensions are being interpolated simultaneously, allows the nodes to be positioned according to the characteristics of the given transformation. In other words, more nodes can be allocated to areas within the color space represented by the LUT where the function being approximated varies rapidly, while less dynamic areas can be suitably served by fewer nodes. As will be seen below, this discussion for the 3-D case is easily extended to higher dimensions.

Figure 4:
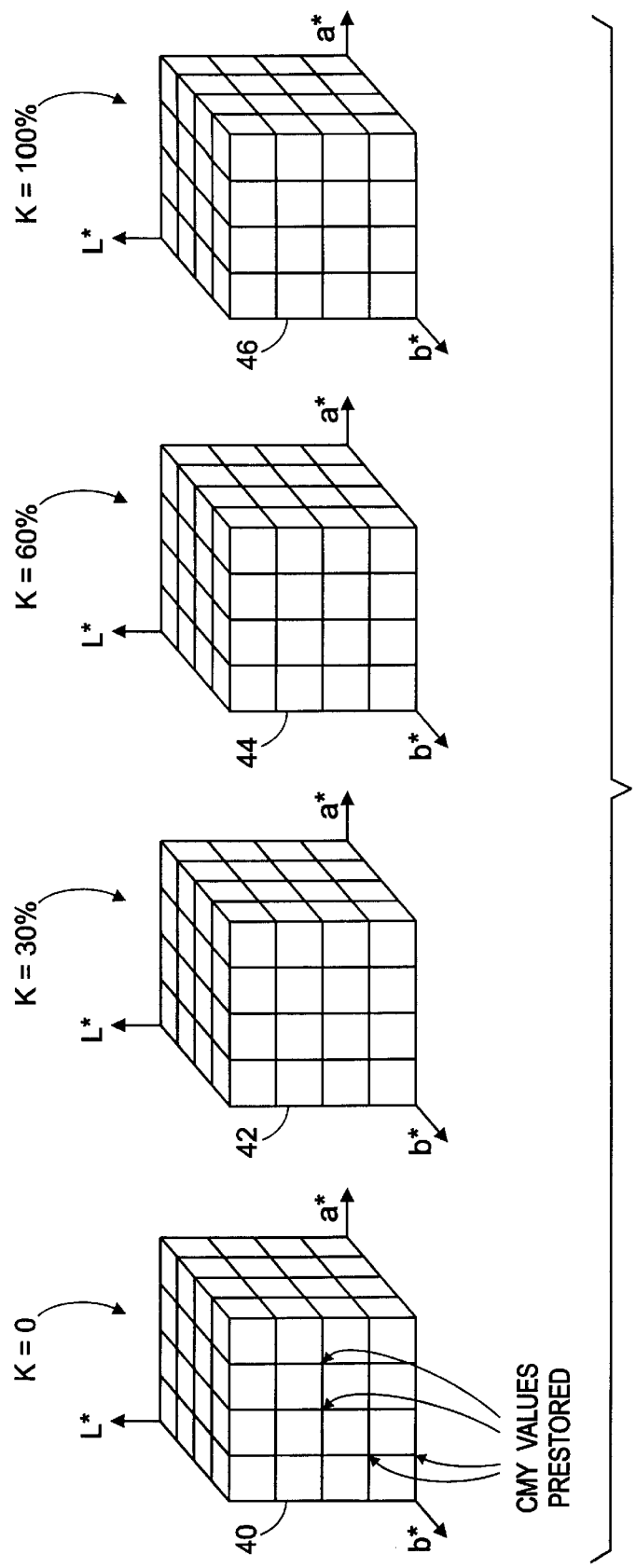
FIG. 4 is a graphical depiction of a rectangularly arranged four-dimensional lookup table.
Figure 5:
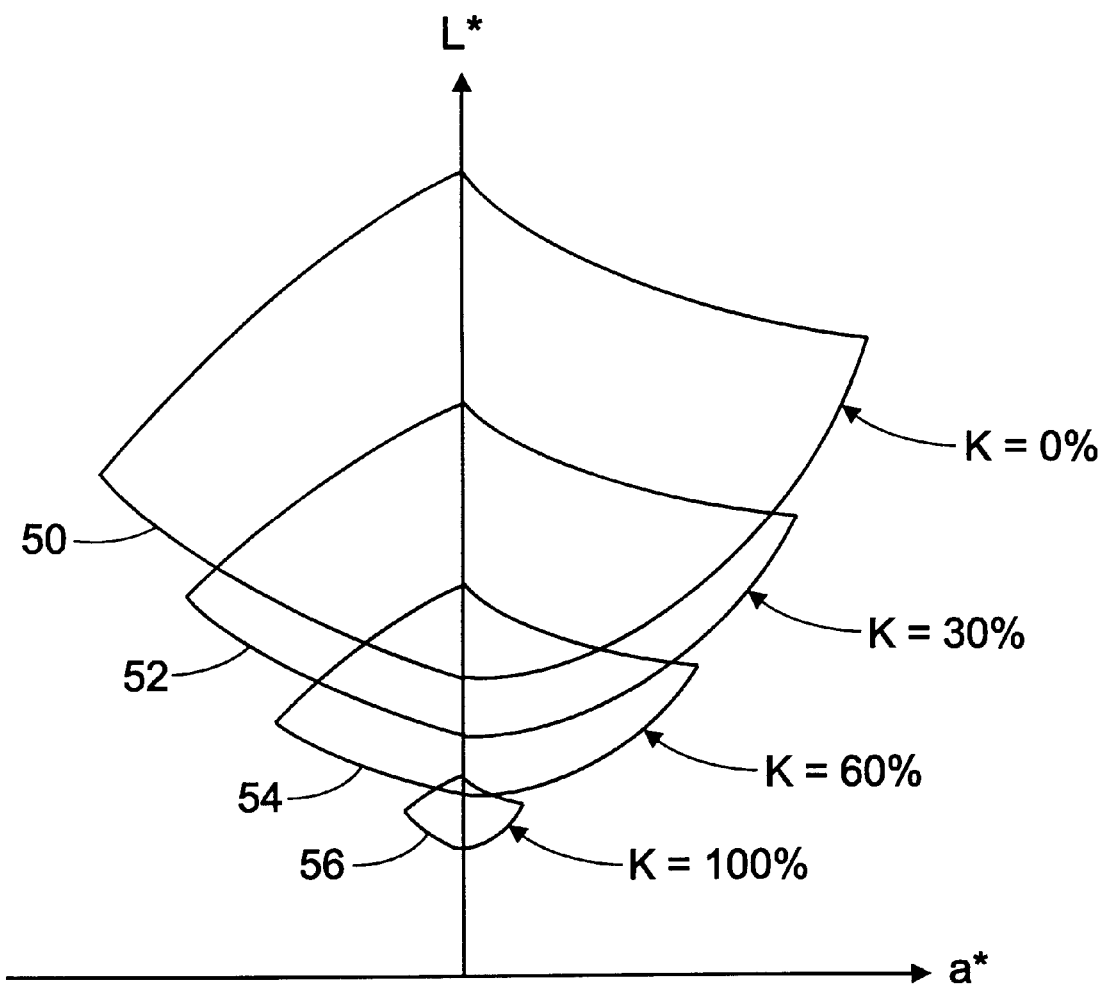
FIG. 5 is a two-dimensional depiction of color space measured from a calibration print of a FIG. 4 device.

FIG. 4 illustrates a use of the present invention in higher dimensions. A four dimensional input color space is transformed into a three dimensional space, for example from CMYK to L*a*b* in order to generate a printer characterization. In this case, the input is a 4-D quantity, which we break down into a set of 3-D tables corresponding to the CMY dimensions, and a 1-D table corresponding to the K dimension. A plurality of the 3-D tables or grids 40, 42, 44, 46, each vary in C, M, and Y, but are fixed at various preselected addresses in the K input dimension. If we were to print the CMYK values corresponding to the nodes in each of the 3-D grids, and measure the L*a*b* values of the resulting prints, we would obtain a series of gamuts 50, 52, 54, 56 in L*a*b* space as seen by reference to FIG. 5. Each gamut volume corresponds to variations in C, M, and Y, with fixed K. Note that as the percentage of K increases, the variation in color, and hence the gamut volume, decreases. For the case where K=100% 56, we have almost negligible color variation.

Figure 6:
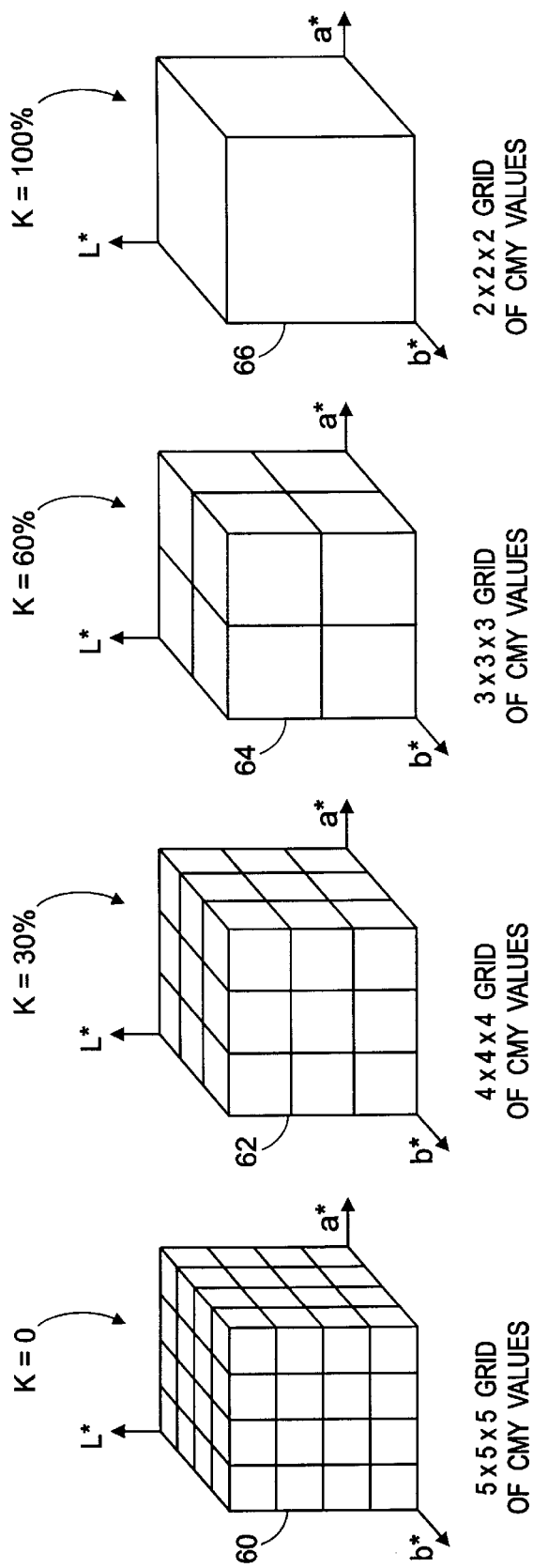
FIG. 6 is a graphical depiction of a four-dimensional lookup table suitable to practice the present invention.

This observation of negligible color variation at high levels of K motivates a proposed lookup table seen in FIG. 6. For K=0, we would use a relatively fine C-M-Y grid 60 to capture large variations in color. As K increases, the C-M-Y grids 62, 64 would become coarser; and when K=100%, we would use the coarsest C-M-Y grid 66 to capture relatively small color variations perceptible through the large amount of black.

Note that the LUT approximation passes exactly through the measured (L*a*b) values at the CMYK nodes, and provides a piecewise linear approximation for all intermediate CMYK values. Two points arise from this observation. First, averaging of multiple measurements at the node locations would likely provide a smoother and more reliable estimate of the characterization function. Secondly, superior results are to be expected if the C, M, Y, K are first individually linearized to a metric in the output space. That is, if the printer characterization maps CMYK to L*a*b*, we would desire that the C, M, Y, and K are first component wise linearized to some metric in L*a*b* such as "delta E from paper" or "equivalent neutral L*". (This would minimize the LUT approximation error at least along the C, M, Y, K axes.) One way of achieving this is to preferably generate, as a separate first step, a set of 1-D correction TRC's that linearize each printer separation. All CMYK values (i.e. from the target, and from images) would then always pass through these linearization TRC's prior to printing. If this 2-pass approach is unacceptable, it is possible to print a set of C, M, Y, K stepwedges along with the multidimensional grid values, and compute the linearization TRC's "on the fly".

The conventional printer characterization LUT would employ a 4-D Cartesian grid with $N_j$ nodes along the i-th axis. For $N_j=5$, the size of the LUT (and hence the number of required measurements) would be $5^4=625$ nodes. This is just under 3 times the number of nodes required by the proposed LUT structure to achieve the same accuracy. The new technique achieves greater storage efficiency because more nodes are placed where the color variation is expected to be large (i.e. for small values of K).

As the input dimensionality increases (as would be the case with the characterization of hi-fi color devices), the potential savings in the LUT size achieved with the new technique would also increase.

The idea of breaking down an N-dimensional interpolation problem into (N−1) dimensional interpolation followed by 1-D interpolation can be recursively applied. That is, the (N−1)-dimensional interpolation can now be split into (N−2)-dimensional interpolations followed by 1-D interpolation. With each such iteration, added flexibility in node placement is obtained at the expense of a modest amount of additional computational cost to do the interpolations.

The invention has been described with reference to the preferred embodiment. Modifications and alterations will occur to others upon a reading and understanding of this specification. It is intended that the invention be construed as including all such modifications and alterations insofar as they come within the scope of the appended claims or the equivalents thereof.

Having thus described the preferred embodiment of the invention, I now claim:

1. A method of transforming an input color to an output color using a multidimensional color transformation table comprising a plurality of nodes where each node contains an output color value, the method comprising:
   non-rectangularly spacing the plurality of nodes within an input color space defined by the multidimensional color transformation table;
   receiving the input color comprising an input color address;
   selecting from the plurality of nodes, a first set of nodes and a second set of nodes, each set adjacent to the input color;
   interpolating the output color values from the first set of nodes to produce a first output color boundary and interpolating the output color values from the second set of nodes to produce a second output color boundary; and
   performing a one-dimensional interpolation between the first output boundary and the second output boundary to produce the output color.

2. The method of transforming an input color as set forth in claim 1 where the selecting step comprises:
   continuing selecting from the sets of nodes further subsets of nodes until subsets of four nodes are achieved.

3. The method of transforming an input color as set forth in claim 2 where the interpolating step comprises:
   interpolating in 2-dimensions the color values of the subsets of four nodes.

4. The method of transforming an input color as set forth in claim 3 where the performing step comprises:
   continuing performing one-dimensional interpolations on successive results of the 2-dimensional interpolations until all dimensions are interpolated.

5. The method of transforming an input color as set forth in claim 1 where the multidimensional color transformation table comprises N input dimensions where N is an integer greater than one, the color transformation table being configured as a plurality of N−1-dimensional tables disposed along a remaining input dimension, the method further comprising:
   noting in the input color a first component associated with the N−1-dimensional tables and a second component associated with the remaining input dimension.

6. The method of transforming an input color as set forth in claim 5 where the selecting step comprises:
   selecting from the plurality of N−1-dimensional tables:
      a first table being one of the N−1-dimensional tables adjacent to the second component based on the noting step,
      a second table being one of the N−1-dimensional tables oppositely adjacent to the second component based on the noting step; and
   identifying in each of the selected tables a plurality of nodes surrounding the first component.

7. The method of transforming an input color as set forth in claim 6 where the interpolating step comprises:
   interpolating the output color values from the nodes identified in the first table to produce a first output boundary, and interpolating the output color values from the nodes identified in the second table to produce a second output boundary.

8. The method of transforming an input color as set forth in claim 5 where the non-rectangular spacing step comprises:
   placing the plurality of nodes in the input space such that the output color values contained in ones of the nodes are significantly distinct from the output color values contained in others of the nodes.

9. The method of transforming an input color as set forth in claim 5 where the non-rectangular spacing step comprises:
   placing the plurality of nodes in the input space such that selected ones of the N−1 dimensional tables contain a number of nodes different than others of the N−1 dimensional tables.

10. The method of transforming an input color as set forth in claim 5 where the non-rectangular spacing step comprises:

placing the plurality of nodes in the input space such that selected ones of the N–1 dimensional tables contain arrangements of nodes different than others of the N–1-dimensional tables.

11. In an electronic imaging system which includes a receiver for receiving a digital representation of an input image element in a first color space defined by N dimensions, where N is an integer greater than one; a conversion processor for converting the input image element to an output image element; and an image output apparatus producing the output image element on an output medium, the conversion processor comprising:

an N-dimensional look up table defining a plurality of non-rectangularly placed nodes loaded with an output image value;

an N–1-dimensional interpolator producing a first and a second output image boundary value associated with N–1 dimensions of the input image element; and a 1-dimensional interpolator providing the output image element by interpolating between the first and second output image boundary values.

12. The electronic imaging system of claim 11 where the look up table comprises:

a plurality of nodes each loaded with an output image value significantly distinct from output image values at other nodes.

13. The electronic imaging system of claim 11 where the look up table comprises:

a plurality of N–1-dimensional tables spaced along a remaining input dimension, where selected ones of the tables contain a number of nodes different from others of the tables.

14. The electronic imaging system of claim 11 where the look up table comprises:

a plurality of N–1 -dimensional tables spaced along a remaining input dimension, where selected ones of the tables contain arrangements of nodes different from others of the tables.

15. The electronic imaging system of claim 11 where the image output apparatus comprises a printer.

16. The electronic imaging system of claim 11 where the image output apparatus comprises a copier.

* * * * *